C. C. JOY.
CUSHION TIRE.
APPLICATION FILED NOV. 14, 1917.
1,322,452.
Patented Nov. 18, 1919.
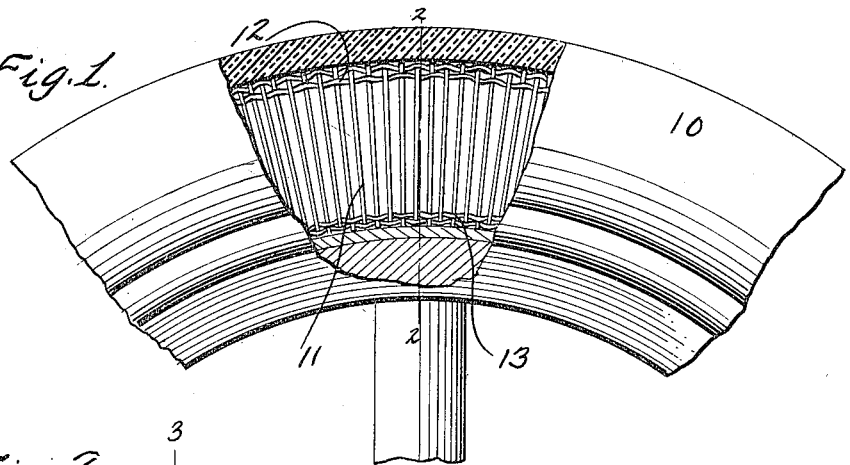
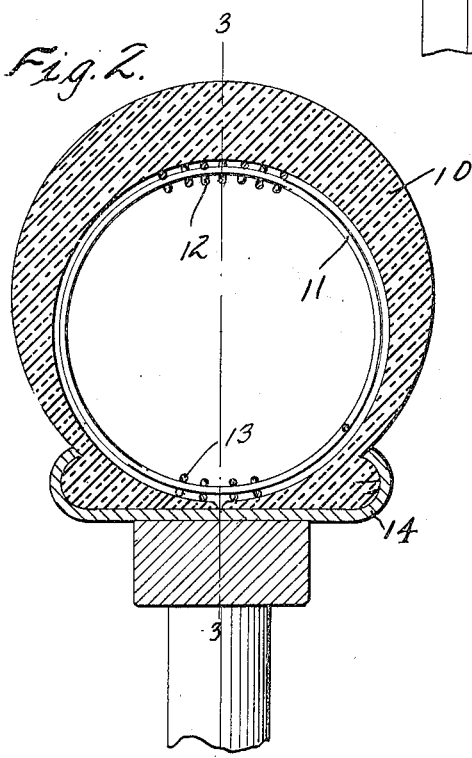
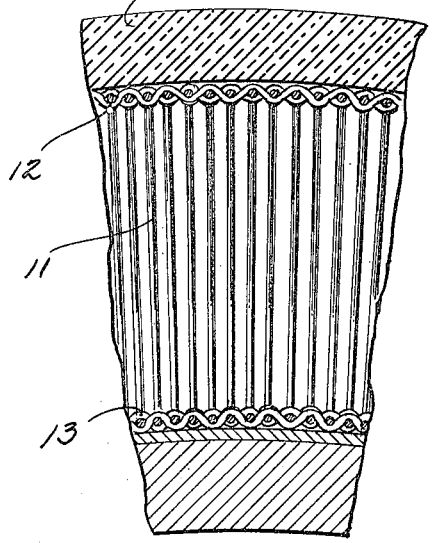
Witnesses
Inventor
C. C. Joy

UNITED STATES PATENT OFFICE.

CHRISTOPHER C. JOY, OF FORT HUACHUCA, ARIZONA.

CUSHION-TIRE.

1,322,452.  Specification of Letters Patent.  Patented Nov. 18, 1919.

Application filed November 14, 1917. Serial No. 202,001.

*To all whom it may concern:*

Be it known that I, CHRISTOPHER C. JOY, a citizen of the United States, residing at Fort Huachuca, in the county of Cochise, State of Arizona, have invented certain new and useful Improvements in Cushion-Tires; and I do hereby declare the following to be a full, clear, and exact description of the invention, such as will enable others skilled in the art to which it appertains to make and use the same.

This invention relates to new and useful improvements in tires and particularly to cushion tires.

One object of the present invention is to provide a simple and effective device of this character which will be strong and durable and which will possess the resilient qualities of the pneumatic tire but without the undesirable puncturing feature.

Another object of the present invention is to provide a resilient device which is adapted to be placed within the outer shoe or casing of a pneumatic tire whereby the shoe will be held in the same shape as when blown up with air and its edges and beads retained in contact with the rim. This is brought about by making the structure resilient mainly at its lateral sides and somewhat along its tread side, but providing it along its rim side with a series of reinforcing strands, the series being of a width to extend over onto the edges of the shoe and of a size circumferentially to fit closely therein.

Other objects and advantages will be apparent from the following description when taken in connection with the accompanying drawing.

In the drawing:

Figure 1, is a fragmentary elevation of a vehicle wheel showing the tire constructed in accordance with the invention, applied, the casing, rim and felly being partly broken away.

Fig. 2 is a vertical transverse sectional view taken on the line 2—2 of Fig. 1.

Fig. 3 is an enlarged vertical sectional view taken on the line 3—3 of Fig. 2.

Referring particularly to the accompanying drawing 10 represents the outer casing or shoe of the tire in which is placed my resilient device.

The device which is removably disposed within the shoe or casing includes an endless ring 11 formed from a single length of suitable stiff wire wound into a coil or helix. Interwoven in the convolutions of the coil, at the outer portion or tread side thereof, are the circumferentially extending strands of wire 12, while similar strands of wire 13 are interwoven with the convolutions at the inner portion or rim side of the ring. The entire ring and interwoven strands are placed within the tire shoe and said shoe secured to the rim 14 in the usual manner.

The coiled ring will distend the shoe in the manner in which it would be distended were the shoe filled with air, but without any danger of collapse of the tire should the shoe become punctured. The ring will be possessed of practically the equivalent in resiliency as a pneumatic tire. The interwoven strands being of wire and bent rather sharply around the convolutions, as shown, hold the latter at the inner and outer portions of the ring from moving toward and away from each other as pressure is brought to bear on the tire under the load of the vehicle. Also the strands 13 at the rim side of the ring make up a series of sufficient width to bridge the gap between and extend over onto the adjacent edges of the shoe. Since the convolutions of the helix stand nearer together at the rim side than at the tread side, the strands 13 must be bent more sharply than the strands 12 in order to maintain the strictly radial position of all convolutions, and the sharper bends in the strands 13 will cause the inner side of the ring to be stiffened to a greater degree than the bends in the strands 12 at the outer side, as will be clear. This is not objectionable, because stiffness at the inner side of the ring prevents the extreme edges of the shoe from leaving the rim if its beads rock thereon under pressure, while a more resilient series at the outer side of the ring underlying the tread of the shoe will yield to pressure and to inequalities in the roadway, although most of the resiliency of this structure is at its lateral sides where the convolutions are not connected by any strands.

The device is extremely simple in construction and can be inserted in any of the outer casings of pneumatic tires now in use.

Furthermore, old blown out tire casings can be readily used by inserting the rings in them.

What is claimed is:

In a tire, a resilient member for insertion within the shoe, the same composed of an endless helix of wire whose convolutions are of one size throughout, a series of metal strands extending longitudinally of the helix at the tread side thereof and interwoven with the convolutions, and a like series at the rim side of a width to bridge the gap between and overlie the edges of the shoe.

In testimony whereof I affix my signature in the presence of two witnesses.

CHRISTOPHER C. JOY.

Witnesses:
EVERETT W. NATION,
EMMET D. MURPHY.